July 18, 1961 R. BERRETT 2,992,488
WALL STUD OR BRACE FINDER
Filed March 6, 1958
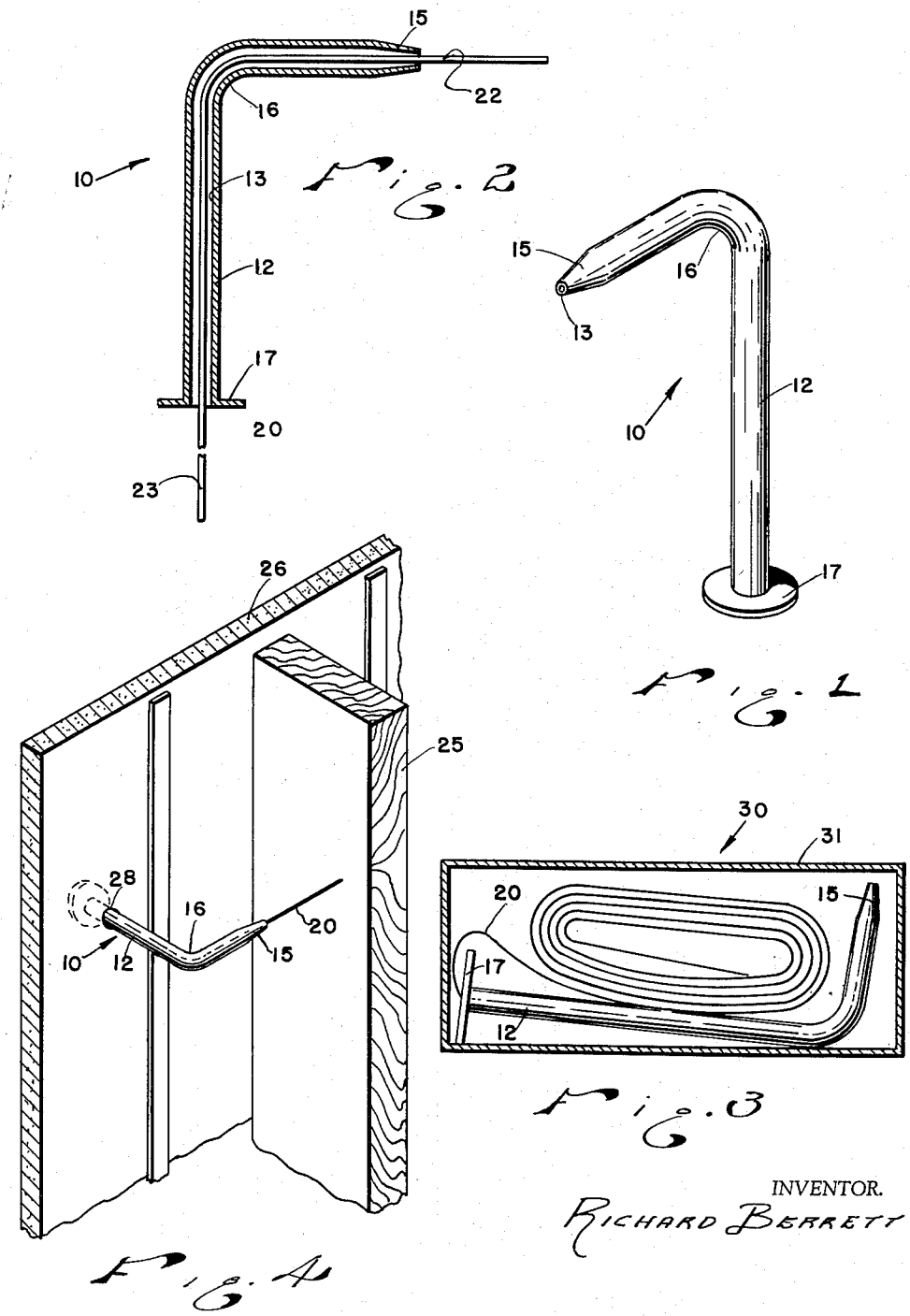
INVENTOR.
Richard Berrett

2,992,488
WALL STUD OR BRACE FINDER
Richard Berrett, 959 Medio Road, Santa Barbara, Calif.
Filed Mar. 6, 1958, Ser. No. 719,606
1 Claim. (Cl. 33—169)

This invention relates to hand tools and more particularly to a measuring device.

It is an object of the present invention to provide a measuring device for locating hidden wall studs and braces in a simple and efficient manner without unnecessarily damaging the finished wall surface.

Another object of the present invention is to provide a wall stud or brace finder having self contained accurate measuring means that will eliminate all speculation during the location of such hidden members so that a permanent fastener may be positively driven through the wall toward the hidden member without requiring an unnecessary series of futile attempts prior thereto.

Other objects of the invention are to provide a wall stud or brace finder bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

FIGURE 1 is a perspective view of a measuring device made in accordance with the present invention;

FIGURE 2 is a longitudinal cross sectional view of the device shown in FIGURE 1;

FIGURE 3 is a plan view, with parts broken away, of a package containing the measuring device made in accordance with the present invention in storage position; and FIGURE 4 is a fragmentary perspective view illustrating the actual use of the measuring device made in accordance with the present invention.

Referring now more in detail to the drawing, a stud or brace finder 10 made in accordance with the present invention is shown to include a hollow L-shaped housing 12 formed from a single piece of tubular metal stock with continuous smooth interior and exterior longitudinal wall surfaces having a longitudinal bore 13 extending through the base and leg portions thereof. The free end 15 of the base portion is tapered, while the free end of the leg portion of the housing is provided with a radially outwardly extending flange 17.

A length of self-supporting flexible wire, rod, or tape 20 is slidably supported within the longitudinal bore 13 that extends continuously from the flange 17 at the free end of the leg of the housing to the tapering open end at the free end of the base portion thereof. This element 20 includes a first mark 22 that is exactly one inch from the adjacent extremity, while a second mark 23 is disposed upon the element 20 exactly sixteen inches from the forward end of the element adjacent to the one inch mark 22.

In actual use, an opening 28 is made in the wall 26 at any desired location adjacent to the point where the stud 25 is believed to be located. This hole can be made with a drill, nail, or punch, as may be desired and is preferably of a diameter slightly greater than the outside diameter of the widest part of the housing 12. This enables the measuring device to be freely inserted into the wall so that the base end thereof may be rotated into a horizontal plane or at an estimated right angle relative to the stud 25 being located. The flange 17 prevents accidental loss of the device that might otherwise occur if it were accidentally extended too far into the wall. By then inserting the measuring element 20 until the front end thereof strikes the stud 25, and withdrawing the entirely assembly from the hole 28, the exact distance from the hole 28 to the center of the stud 25 can be measured by placing the bend 16 of the stud finder on the exposed side of the wall in overlying relationship with the hole 28, marking the exposed side of the wall at the terminal portion of the element 20, and then extending the mark an additional inch so as to indicate the exact center of the stud. Following this, the fastener may be driven directly into the wall, with the assurance that it will find the stud 25 located in the aforementioned manner. It will be recognized that the unit may be rotated in either direction so that the element 20 can be extended to the left of the operator or to the right, as may be desired. The second mark 23 indicating a length of sixteen inches from the front end of the element 20 is particularly useful for locating additional studs after the first one has been located, since most studs are spaced sixteen inches between centers, whereby the measuring element 20 may be withdrawn and used as a measuring tape along a continuous wall surface.

When not in use the device may be placed within a container 31 with the element 20 in any desired position. Such also makes an attractive package 30 for display purposes.

While various changes may be made in the detail construction, it shall be understood that such changes shall be within the spirit and scope of the present invention as defined by the appended claim.

What I claim as new and desire to protect by Letters Patent of the United States is:

An L-shaped tubular measuring tool for insertion through a small hole in a substantially closed wall for use behind the external wall surface thereof in locating hidden wall studs normally spaced sixteen inches apart within the wall, which comprises a unitary closed side wall tubular L-shaped rigid housing formed with an integrally fixed circular flange extending radially outward from one free end thereof, and a normally straight bendable round wire measuring element of greater length than the length of said housing, said housing formed with a tubular leg member, a tubular base member of shorter length than said leg member, and a curved tubular portion formed on a fixed radius intermediate said base and leg members, said base member extending at right angles relative to said leg member and formed with a free end portion tapered toward the terminal end thereof, said housing having a longitudinal continuous bore extending therethrough with a smaller outlet in said base member than its outlet in said leg member, said circular flange forming turning means for rotating said leg and base members in use within the wall and controlling the extent of said leg member through the hole in the wall whereby said tool cannot be lost within the substantially closed wall, said normally straight bendable round wire measuring element slidably carried within said continuous, longitudinal bore in said tubular housing and with its end portions extending outwardly from both ends of said housing, the rearward free end portion of said round wire projecting outwardly from said housing and beyond said circular flange thereon being provided with measuring indicia at definite distances from the terminal end of said forward free end portion, said tapered free end portion of said base member forming means for guiding said forward free end portion of said round wire parallel with the surface of the wall being used with and perpendicular to said leg member of the tool, whereby said round wire can be moved longitudinally through the housing with the forward terminal end thereof moving into contact with the wall supporting stud being sought for determining the distance of said sought stud from said leg member.

References Cited in the file of this patent

UNITED STATES PATENTS 2,480,725  Gilbert _____ Aug. 30, 1949

FOREIGN PATENTS 16,863  Great Britain _____ Sept. 9, 1895